3,250,667
CONTROL OF MICROORGANISMS WITH ACROLEIN

Marvin Legator, Modesto, Calif., assignor to Shell Oil Company, New York, N.Y., a corporation of Delaware
No Drawing. Filed May 15, 1961, Ser. No. 109,821
4 Claims. (Cl. 162—190)

This application is a continuation-in-part of my copending application Serial No. 9,453, filed February 18, 1960, which in turn was filed as a continuation-in-part of my then copending application Serial No. 803,821, filed April 3, 1959, and now both abandoned.

This invention relates to a method for controlling noxious microorganisms encountered in the manufacture of paper.

In modern paper-making processes, control of microorganisms is a serious problem. Current practice involves recycle of a large part, if not most, of the water involved in the processes. This causes rapid build-up of microorganism populations in aqueous media involved—particularly in the recycled "white water"—because these aqueous media ordinarily are warm and contain dissolved materials (mineral salts, and organic materials, including sugars, starches, cellulose, and the like) which are readily available nutrients for microorganisms present therein. The presence of large populations of these microorganisms in the aqueous systems of paper mill operations in turn lead to serious difficulties in producing high quality paper. Some of these organisms form slimes; others attack process equipment; others attack the cellulose pulps; others cause staining of the paper.

By far the most serious problem in the majority of cases is the control of slimes and slime-forming organisms. These slimes may take the form of films, filaments, strands or viscous masses of irregular shape, and may be gelatinous, rubbery, or horny in character. They often are colored—in some cases the microorganisms themselves are colored, while in others the color is derived by reaction between the organisms and chemicals in the water, or the metals of the process equipment. Slimes cause serious problems in paper-making, because they can cause spots, holes and breaks in the paper; they can cause the paper to be off-colored and/or of inferior quality; they can obstruct openings in pipes, screens and felting equipment, reducing the efficiency of process equipment and intefering with the formation of the paper. If slimes are allowed to form, substantial periods of production time are lost at frequent intervals to permit clean-up of the equipment. Control of slimes and slime-forming microorganisms consequently is a major factor in the manufacture of paper.

Bacteria also can cause corrosion; one kind oxidizes sulfur compounds (often present from pulping and other operations) to sulfuric acid, which of course attacks piping and other process equipment; another kind reduces sulfate compounds to the corresponding sulfides, which reacts with iron present in the process equipment, resulting in gradual wearing away of the equipment.

Other bacteria can cause such undesirable effects as: off-odor of the paper; weakness of the paper; weakening of paper mill felts; interference with rosin sizing; and interference with peroxide bleaching by decomposing peroxide.

Control of microorganisms consequently is essential to successful paper making. Effecting control of such microorganisms is not simple, however, because of the wide variety of the organisms which must be dealt with and the great difference in the characteristics of the various organisms. Algae give relatively little trouble in paper mill streams because most algae must be exposed to the light before they can grow normally. Bacteria and fungi, however, present serious problems. Three general groups of bacteria must be contended with in paper mill streams: (1) the rod-shaped, spore-forming bacteria such as *Bacillus subtilis, Bacillus pumilus, Bacillus megaterium* and *Bacillus cereus*; (2) rod-shaped gram negative or gram variable bacteria which do not form spores, such as the Pseudomonas, Proteus, Achromobacter, Flavobacterium, Alcaligenes, Cellulomonas, Aerobacter, and *Escherichia coli*; (3) filamentous, or mold-like bacteria such as the Actinomyces and the iron bacteria, Crenothrix or Leptothrix. The spore-forming bacteria often form particularly troublesome slimes—ones which are tough and rubbery, and very resistant to chemical control. Of the non-spore-forming bacteria, the species of Aerobacter are probably the most troublesome, for they are prolific producers of slimes in the forms of gelatinous films, strands or viscous masses of irregular shape. The filamentous bacteria (Chlamydobacteriales) produce extremely bulky slimes, often colored, and which stain the paper. Genera which are particularly bad in this respect are Sphaerotilus, Clonothrix, Leptothrix and Crenothrix. Pink slimes can be caused by the bacteria, *Serratia marcescens*, alone, or more often in combination with or particular strains of *Bacillus subtilis*, and/or fungi. Both the mold-type and yeast-type fungi can form slimes. Usually the fungal slimes are loose, bulky and stringy, and often are colored. Significant members of the mold-type fungi are: Penicillium, Fusarium, Trichoderma, Alternaria, Spicaria, Botrytis, Citeromyces and Aspergillus. Significant members of the yeast-type fungi are Oidium and Monilia. Of the corrosion-promoting bacteria, *Thiobacillus thiooxidans* (of the sulfur bacteria) and *Desulfovibrio desulfuricans* (of the sulfate-reducing bacteria) are most important. The latter bacteria often are associated with slimes produced by *Aerobacter aerogenes*. Wool degrading bacteria attack the felts used in paper-making, species of Bacillus being most troublesome in this respect, but species of Pseudomonas, Proteus and Alcaligenes also causing significant damage to paper-making felts in some cases.

It will be evident from the foregoing that effective control of microorganisms present in paper mill aqueous systems will require a chemical which is toxic to all kinds of microorganisms. Further, such a control chemical must not adversely affect the properties of the paper which is produced.

It has now been found that acrolein fully meets these requirements, for acrolein has been found to control a very wide spectrum of microorganisms, including fungi, bacteria and algae of the kinds present in paper mill aqueous systems without any adverse effect upon the paper which is produced, using aqueous media containing biocidally effective concentrations of acrolein. Actual plant-scale tests have shown that acrolein maintains its effectiveness in controlling microorganisms in the actual aqueous media themselves, including white waters, despite the presence of pulp, sizing and other materials employed to provide paper of particular properties, and organic materials present in the aqueous media because of the treatment of the cellulosic materials used to form the paper. Also, the tests which have been made show that acrolein does not accumulate or form residues in finished paper made from media containing acrolein for slime control. Thus the product has the additional advantage of meeting Food and Drug Administration requirements on paper used in or around food and feed. Because of these properties, acrolein now is considered to be an outstanding material of significant commercial importance for controlling noxious, undesired microorganisms, including slime-forming organisms, in paper mill white waters and other aqueous media involved in the aqueous systems of paper mills.

It has been found that acrolein is a very effective microbiocide and very stable in paper mill white waters. This combination of properties permits the use of very small concentrations of acrolein to ecectively control slime-forming and/or other noxious microorganisms. The effectiveness of acrolein as a microbiocide has been found to be a function of two factors: time and concentration. Thus, at the temperatures ordinarily encountered in paper mill white waters—i.e., from about 70° F. to about 130° F.—it has been found that acrolein will completely control microorganisms in white waters if the product of the acrolein concentration in parts per million by weight of the white water, and the time in minutes of contact of the acrolein-treated white water with the microorganisms is 125 or greater. That is to say, the minimum lethal dosage is 125 p.p.m.-min. and the acrolein concentration and contact time in any given case to give effective control of microorganisms will be determined by the relationship:

Acrolein concentration, p.p.m.×contact time, minutes=at least 125 p.p.m.-min.

In those parts of the paper-making process wherein recycled white water is present, contact time is of the order of hours, and very small concentrations of acrolein—of the order of from about 0.1 to about 1 part per million, based on the weight of the aqueous stream treated—are effective in preventing build-up of noxious microorganisms. To insure that the acrolein will destroy or at least control substantially all of the microorganisms, it is preferred to employ an acrolein concentration of at least 0.3 part per million, with concentrations of about 0.4 to 0.6 part per million being best. In usual paper mill procedures, wherein white waters are recycled indefinitely, the necessary minimum contact times corresponding to these desired and preferred concentrations—i.e., 250 minutes, or about 4¼ hours when the acrolein concentration is 0.5 part per million—are invariably exceeded. Concentrations above about 1.5 parts per million preferably are not used; in most cases little additional advantage accrues from the use of higher concentrations, and if higher concentrations are used, the acrolein may pass into the atmosphere where it may cause discomfort of the operating personnel. It has been found that at temperatures above about 70° F., where there is a large liquid surface area, together with relatively small liquid volume, involved, (as at the point where the aqueous pulp passes onto the screen, or "wire" to form the paper), acrolein will tend to pass into the atmosphere. For example, at 80° F. the maximum tolerable concentration of acrolein in a white water under conditions where the surface area-to-volume of the white water is large is about 3 parts per million, while at 120° F., the maximum tolerable concentration of acrolein in white water under such circumstances is a little less than 2 parts per million. However, if the liquid surface area-to-volume of the white water is not great, then higher concentrations of acrolein—up to 5–10 parts per million by weight, can be present without causing discomfort to operating personnel; this is particularly true if the temperature is not above about 70° F.

The acrolein can be introduced at any point in the paper-making process to provide control of microorganisms present in the aqueous system of the process. By aqueous system is meant all aspects of the process in which water plays a major role; included are aqueous suspensions of pulp, water entering, leaving and being recycled in the process, various aqueous streams entering and leaving individual items of process equipment and aqueous solutions and suspensions present in that equipment. Included in the systems are aqueous solutions or suspensions which are being stored, as well as those being actively used or processed in the paper making procedure. As used herein, "aqueous medium" includes all water, aqueous solutions and aqueous suspensions involved in the paper-making procedure, including fresh water, recycled "white water," suspensions of pulp, and aqueous solutions separated from the pulp during its processing.

Because of heat, pressures and chemicals and used in pulp preparation, slime generally is not a problem in pulping operations. However, corrosion caused or promoted by bacteria can be encountered in pulping operations, and acrolein can be used to control it. To control microorganisms in as much of the paper mill aqueous system as quickly as possible, the acrolein should be added as far upstream as is convenient. The beater chest, machine chest, or refiner headbox are usually accessible and excellent locations to introduce the acrolein. Its introduction at one of these points will provide the maximum contact time between the acrolein and the microorganisms to be controlled; also, it will concurrently provide treatment of the white-water system. Also, the usually large supply of pulp in the chests will tend to smooth out and minimize variation in the concentration of acrolein in the aqueous medium should the rate at which acrolein is added vary.

In usual paper-making operations, a relatively concentrated pulp (containing 3–4% solids) is used in the beater chest, or corresponding equipment, that pulp is diluted about 5-fold with recycled white water, and then passed to the paper-making machinery. It is in the diluted pulp, containing the white water, that the acrolein concentration cannot be allowed to exceed about 2–3 parts per million—the diluted pulp is handled in such manner that it has a very high surface area-to-volume ratio and is usually at a temperature well above 70° F., so that the acrolein has a greater tendency to escape into the air; furthermore, the pulp stream is ordinarily confined in any process equipment, but its surface is ordinarily exposed to the air. The concentrated pulp in the beater chest has a relatively small surface area-to-volume ratio and is usually at a relatively low temperature; consequently, higher acrolein concentrations—up to 5–10 parts per million—can be tolerated. This fact provides an additional reason for adding the acrolein in the beater chest, or corresponding equipment, since accidental addition to the beater chest of what would be in the white water streams, an overdosage of acrolein will not cause distress to operating personnel. Preferably, therefore, the acrolein is added to the beater chest or corresponding equipment.

Acrolein as such can be introduced into the aqueous medium to be treated. However, because of its volatile, irritating nature, acrolein preferably is diluted with water and the dilute solution used. The acrolein should be introduced well below the surface of the liquid into which it is being introduced, and the liquid should be well stirred to prevent any local high concentration of acrolein which would cause it to pass into the atmosphere. To prevent the acrolein concentration from rising above the tolerable limits, it is desirable to introduce the acrolein into the paper-mill aqueous system slowly, gradually raising the acrolein concentration from a very low value up to the desired concentration. Preferably, the acrolein is introduced continuously to maintain the desired concentration. However, where a batch process is used the acrolein also can be introduced batchwise, with proper precaution to maintain the acrolein concentration below the tolerable limits. It will generally be found most desirable to introduce the acrolein at such points in the system and at such rates as to maintain the concentration constant at the same level throughout the system.

At the biocidally effective dosages, acrolein does not affect the other chemicals ordinarily used in the paper-making process and does not interfere with their action. Consequently, the usual sizing agents, fillers, and chemicals which act to alter or modify the tensile strength, particularly the wet strength, absorbency, color, texture, grease resistance, gloss and printability of the final product can be used in the usual manner. The acrolein can be used alone; use of emulsifiers and/or surfactants is not necessary.

The effectiveness of acrolein in controlling microorganisms found in the aqueous systems of paper mills is illustrated by the following examples:

EXAMPLE I

Acrolein has been found to effectively control the following microorganisms.

| Type of organism: | Name of organism |
|---|---|
| Bacterium | Bacillus subtilis. |
| Bacterium | Leuconostoc mesenteroides. |
| Bacterium | Pseudomonas putrefaciens. |
| Bacterium | Pseudomonas aeruginosa. |
| Bacterium | Aerobacter aerogenes. |
| Bacterium | Escherichia coli. |
| Bacterium | Desulfovibrio desulfuricans. |
| Bacterium | Mycobacterium avium. |
| Actinomyces | Streptomyces scabies. |
| Fungus | Chaetomium globosum. |
| Fungus | Botrytis allii. |
| Fungus | Penicillium italicum. |
| Fungus | Lenzites trabea. |
| Fungus | Sacchromyces cereviseae. |
| Fungus | Rhizoctonia solani. |
| Fungus | Helminthosporium turcicum. |
| Algae | Chlorella pyrenoidosa. |
| Algae | Lemna minor. |

EXAMPLE II

*Experimental mill run test I*

Size machine used—75 ton/day machine.

Concentration of acrolein—3 milliliters per minute of 85% by weight acrolein in water run into beater chest, which resulted in a concentration of 1.6–1.7 p.p.m. in the pulp leaving the chest. At the flow box the concentration of acrolein had dropped by dilution to 0.5–0.6 p.p.m.

Temperature water—100+° F.

Results.—Machine selected because of definite slime problems. Prior to initiating test, machine cleaned. The acrolein solution was then introduced and the test run for a three-week period. No slime problem was encountered in this time. Acrolein treatment was then stopped, and slime immediately built up causing the machine to become inoperable.

EXAMPLE II

*Experimental mill run test II*

Size machine used—90–100 ton/day machine.

Concentration of acrolein—0.4–0.6 p.p.m. at the flow box.

Results.—In the test period approximately 117 days, no significant slime build up as determined by the Buckman slime board (a device consisting of a wooden paddle for measuring slime build up—10 grams of slime/day on board considered normal; 20–30 grams of slime/day considered heavy slime concentration).

The following table represents slime board figures for the acrolein and for other commercial compounds previously tested on this machine:

| Compound | Pound Used Per Day | Slime Board Reading, grams |
|---|---|---|
| Busan 881* | .75 | 30 |
| Chlorine dioxide | .50 | 100 |
| Acrolein | .10 | 7 |

*Mixture of disodium cyanodithioimidocarbonate (12.7%); ethylenediamine (4.8%); potassium N-methyldithiocarbamate (17.5%); inerts (65%).

I claim as my invention:

1. A method for combatting slime-forming and corrosion-promoting microorganisms in the aqueous system of a paper-manufacturing plant, said method comprising maintaining in that part of said aqueous system in which recycled white water is present an effective concentration of acrolein amounting to at least 0.1 but not exceeding 1.5 parts per million by weight of the aqueous system.

2. A method for combatting slime forming and corrosion-promoting microorganisms in the aqueous system of a paper-manufacturing plant, said method comprising maintaining in that part of said aqueous system in which recycled white water is present an effective concentration of acrolein amounting to at least 0.1 but not exceeding 1.5 parts per million by weight of the aqueous system with the numeric product of the concentration of acrolein in parts per million by weight of the aqueous system and the time of contact in minutes between the acrolein and the microorganisms to be controlled being at least 125.

3. A method for combatting slime-forming microorganisms in a recycled white water stream in paper manufacture, which method comprises maintaining in said aqueous stream an effective amount of acrolein amounting to at least 0.1 but not exceeding 1.5 parts per million by weight of the said aqueous stream.

4. A method according to claim 1 wherein the acrolein concentration is from 0.4 to 0.6 part by weight per million parts by weight of the aqueous stream.

References Cited by the Examiner

UNITED STATES PATENTS 2,801,216  7/1957  Yoder _____ 210—64

OTHER REFERENCES

Vollrath: Bactericidal Properties of Acrolein, from Proceedings Society for Experimental Biology and Medicine, vol. 36, pp. 55–58, February–June 1937.

DONALL H. SYLVESTER, *Primary Examiner.*

RICHARD D. NEVIUS, MORRIS O. WOLK,
  *Examiners.*

H. R. CAINE, *Assistant Examiner.*